United States Patent
Suzuki et al.

(10) Patent No.: US 6,400,497 B1
(45) Date of Patent: Jun. 4, 2002

(54) OPTICAL FIBER AMPLIFIER

(75) Inventors: Mikiya Suzuki; Shigeru Shikii; Yukihiro Ozeki; Shusei Aoki, all of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 838 days.

(21) Appl. No.: 08/555,901

(22) Filed: Nov. 13, 1995

(30) Foreign Application Priority Data

Nov. 16, 1994 (JP) .............................................. 6-281874
Nov. 16, 1994 (JP) .............................................. 6-281875

(51) Int. Cl.$^7$ .......................... H04B 10/16; G02F 1/35; H01S 3/00
(52) U.S. Cl. ............. 359/337.11; 359/160; 359/341.41; 359/345
(58) Field of Search .................. 359/124, 160, 359/177, 337, 345; 370/5.7

(56) References Cited

U.S. PATENT DOCUMENTS

| | | | |
|---|---|---|---|
| 5,225,922 A | 7/1993 | Chaplyong et al. | 359/124 |
| 5,436,760 A | 7/1995 | Nakabayashi | 359/341 |
| 5,467,218 A | 11/1995 | Taheda et al. | 359/341 |
| 5,513,029 A | 4/1996 | Roberts | 359/177 |

FOREIGN PATENT DOCUMENTS

| | | | |
|---|---|---|---|
| EP | WO 91 18434 | 11/1991 | |
| JP | 03 212984 A | 9/1991 | |
| JP | 6268602 | * 9/1994 | |

OTHER PUBLICATIONS

S.F. Su et al., "Gain Equalization in Multiwavelength Lightwave Systems Using Acoustooptic Tunable Filters", IEEE Photonics Technology Letters, vol. 4, No. 3, Mar. 1, 1992, pp. 269–271.

C.R. Giles et al., "Transient Gain and Cross Talk in Erbium–doped Fiber Amplifiers", Optics Letters, vol. 14, No. 16, Aug. 15, 1989, pp. 880–882.

Kyo Inoue et al., "Tunable Gain Equalization Using a Mach–Zehnder Optical Filter in Miltistage FIber Amplifiers", IEEE Photonics Technology Letters, vol. 3, No. 8, Aug. 1, 1991, pp. 718–720.

* cited by examiner

*Primary Examiner*—Nelson Moskowitz
(74) *Attorney, Agent, or Firm*—Venable; Robert Kinberg; Catherine M. Voorhees

(57) ABSTRACT

An EDFA 1 is comprised of a pre-amp 2 and a post-amp 3, which are connected in series, a photocoupler 4, a long wave pass filter (LWPF) 5 and an LWPF controller 6. The photocoupler 4 is connected to an input-stage of the EDFA 1 and enters the light signal in the LWPF controller 6. The LWPF 5 is located between the pre-amp 2 and the post-amp 3, and its cutoff wavelength is adjustable. A short-wavelength-part of the light signal which is amplified by the pre-amp 2, is cut off by the LWPF 5. The LWPF controller 6 detects an input signal power of the input light signal and adjusts the cutoff wavelength of the LWPF 5 based on the detected input signal power. Gain of light signals which are output from the post-amp 3, are equalized ranging the extensive input signal power and covering wide signal-wavelength bands.

17 Claims, 10 Drawing Sheets

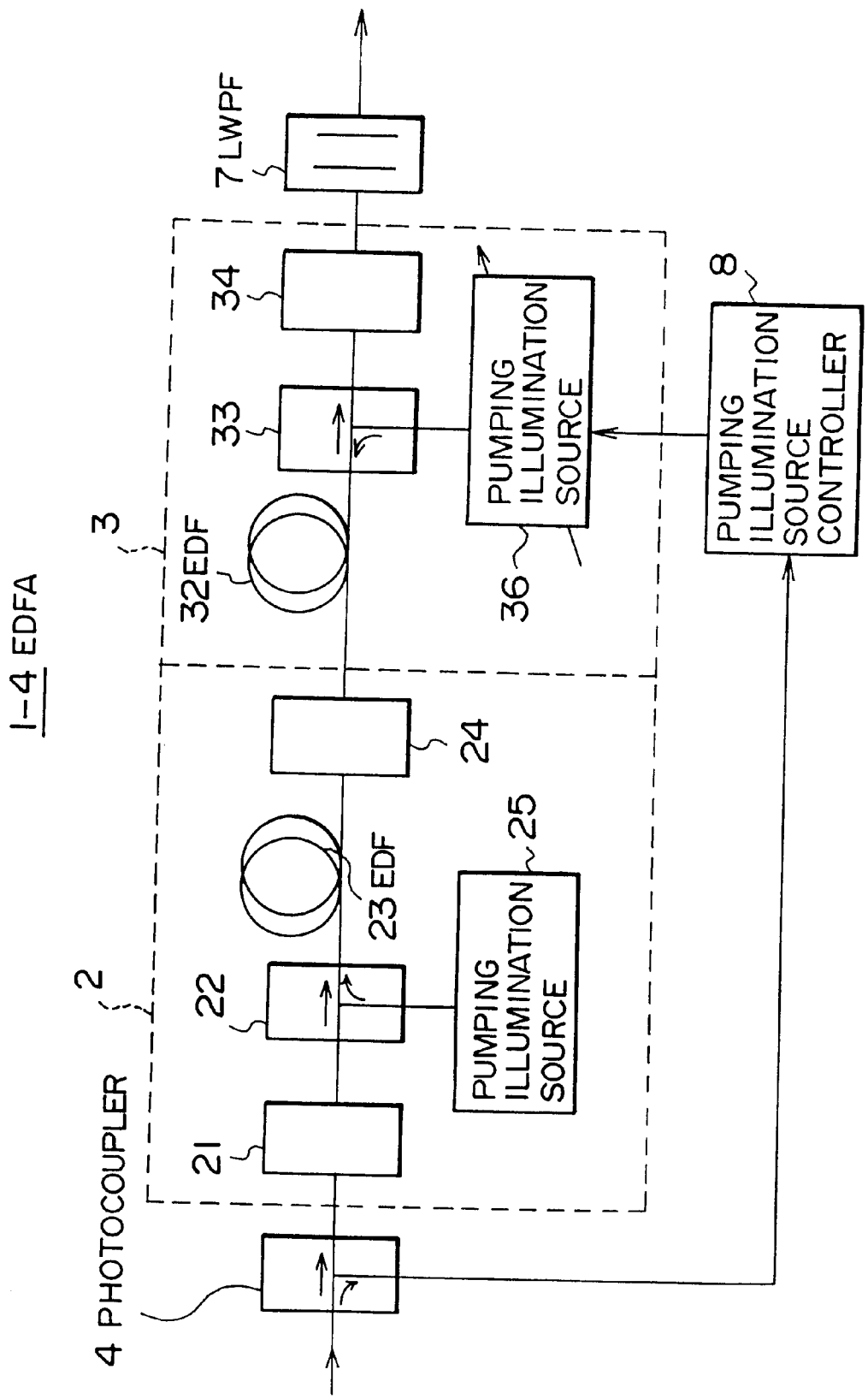

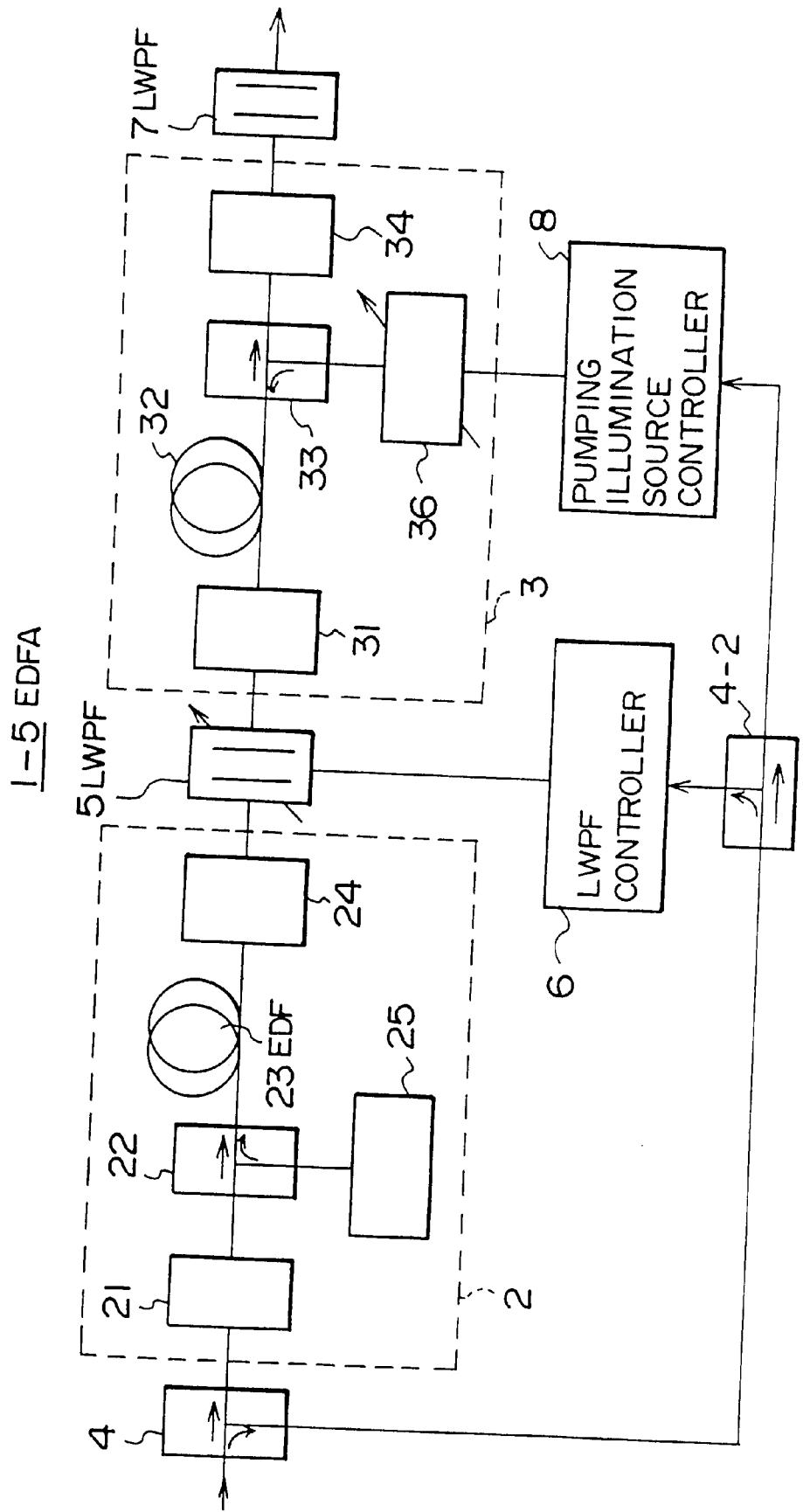

OPTICAL FIBER AMPLIFIER

FIELD OF THE INVENTION

The invention relates to an optical fiber amplifier which directly amplifies an optical signal.

BACKGROUND OF THE INVENTION

The invention especially applies to an erbium ($Er^{3+}$)-doped fiber amplifier (EDFA) which utilizes an erbium-doped optical fiber (EDF). In a conventional EDFA, one end of the EDF is connected through an optical isolator to an input and the other end is connected through an optical isolator to an output. A pumping illumination source provides pumping illumination for the EDF through a photocoupler. Then, the pumping illumination is absorbed by the EDF sufficiently raise the population inversion.

When an input light signal is introduced into the excited EDF from the input-side of the optical fiber, the input light signal is gradually amplified by a stimulated emission of the EDF and the amplified input light signal is output to the output-side of the optical fiber.

Here, the wavelength of the light signal is selected on bands 1550~1560 nm whose loss in a silica fiber is the smallest. Moreover, a wavelength of the pumping illumination is selected on bands 980 nm or 1480 nm which are absorption bands of the EDF. The EDFA has an amplification region on bands 1530~1560 nm, and the EDFA is effective for narrow band light signal transmission by single wavelength. But, in order to utilize the effectiveness an optical fiber transmission line, a wavelength-divisional-multiplex(WDM) system which transmits multiple wavelength channels together is desirable.

When the EDFA is applied to the WDM system, it is important to improve the wavelength-to-gain-deviation characteristic(: gain equalizing of wavelengths), especially since a signal power deviation between each wavelength after transmission becomes fairly large, unless the gain of each wavelength channel at every EDFA repeater is substantially equal. As a result, as the number of repeaters increases, transmission distance is limited by the S/N ratio of the wavelength signal which has minimum amplitude.

For this reason, when a scattering of signal power and S/N ratio between wavelength channels is compensated, the gain equalization of the EDFA is an indispensable technique. Various gain equalizing techniques of the EDFA have been proposed.

For example, it is known that gain dependence of wavelength may be equalized by an optical filter; gain characteristics of the EDF may be controlled by doped aluminum (Al) concentrations, and the EDF may be cooled toward a low temperature to effectuate gain equalization. These techniques allow gain equalizing to be achieved at bands 1540~1560 nm, but not over broader bands. Moreover, in practice, a distance between repeaters is not fixed nor is the light signal power input to the EDFA. These points also make gain equalization of the broader bands difficult.

So, it is desired to provide an optical fiber amplifier which can realize gain equalization over a broader input signal power and wavelength bands.

SUMMARY OF THE INVENTION

In carrying out the invention in one preferred mode, an optical fiber amplifier comprises a optical fiber for direct amplifying a light signal, an pumping illumination source for the optical fiber for providing pumping illumination, detecting means for detecting an input light signal, gain equalizing for equalizing a gain of the light signal and a gain equalizing means controller for controlling the gain equalizing means based on the detected input light signal which is detected by the detecting means, so that the optical fiber amplifier can realize gain equalization over a broader input signal power and wavelength bands.

BRIEF DESCRIPTION OF THE DRAWINGS

FIG. 3 is a modified LWPF 5a.

FIG. 7 is a schematic diagram of a fourth embodiment of the invention.

FIG. 12 is a schematic diagram of a fifth embodiment of the invention.

DETAILED DESCRIPTION OF THE PREFERRED EMBODIMENTS

(A) FIRST EMBODIMENT

Figure 1:
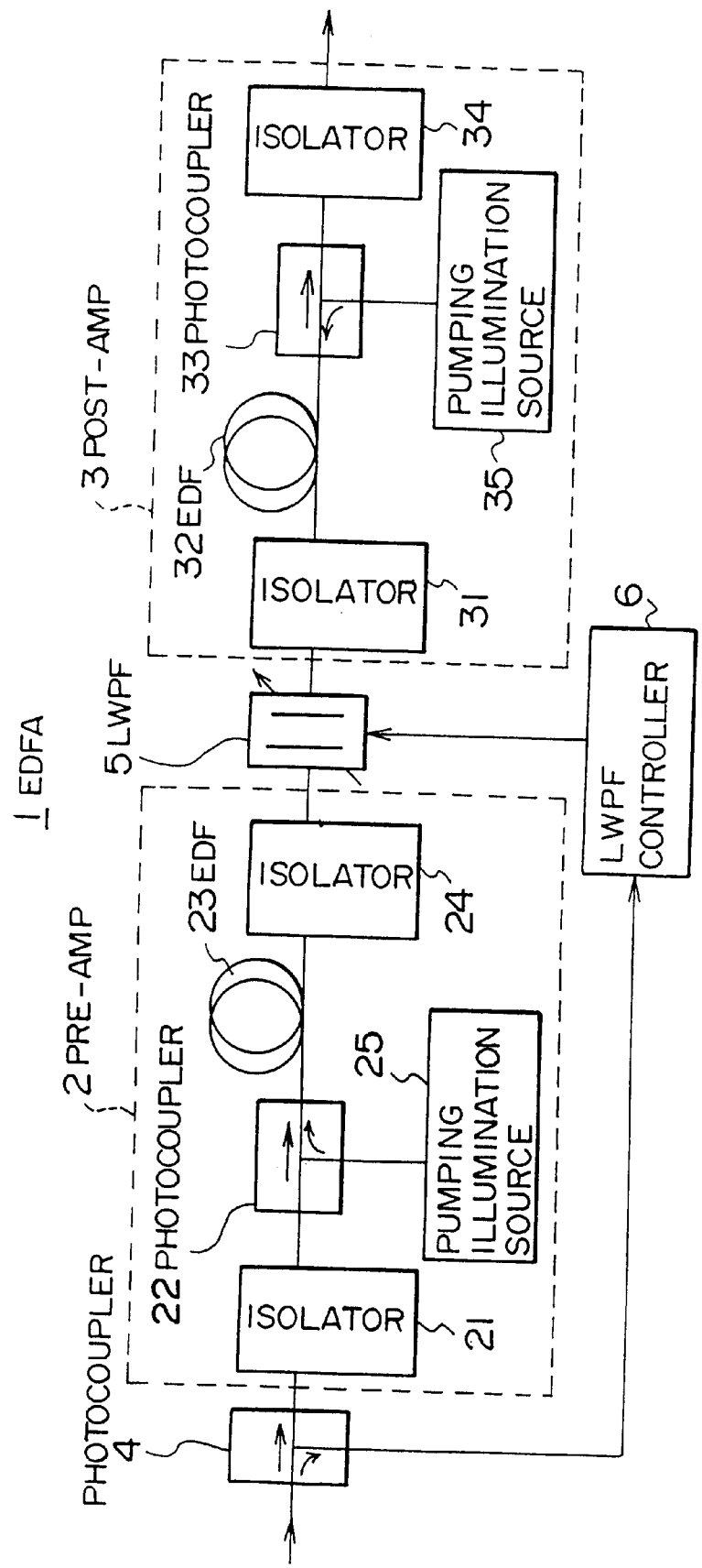
FIG. 1 is a schematic diagram of a first embodiment of the invention.

FIG. 1 is a schematic diagram of a first embodiment of the invention. An EDFA 1 in FIG. 1 employs a multistage amplifier, and is comprised of a front-stage optical fiber amplifier(pre-amp 2) and a rear-stage optical fiber amplifier (post-amp 3), which are connected in series. The pre-amp 2 adapted for forward pumping. In the pre-amp 2, an optical isolator 21, a photocoupler 22 which has a wavelength selectivity, an Al-5 Wt. % doped EDF 23 and an optical isolator 24 are arranged in series along a route of a light signal. A pumping illumination source 25 comprised of a laser diode(LD) is connected with the photocoupler 22. The pumping illumination source 25 provides the EDF 23 with pumping illumination through the photocoupler 22.

A light signal which is input to the EDF 23 is gradually amplified by stimulated emission of the EDF 23. On the other hand, the post-amp 3 is adapted for backward pumping.

In the post-amp 3, an optical isolator 31, an Al-5 Wt. % doped EDF 32, a photocoupler 33 which has a wavelength selectivity and an optical isolator 34 are arranged in series on along a route of a light signal. A pumping illumination source 35 comprised of a laser diode(LD) is connected with the photocoupler 33. The pumping illumination source 35 provides the EDF 32 with pumping illumination through the photocoupler 33. The light signal which enters the EDF 32 is gradually amplified by stimulated emission of the EDF 32. In addition, the optical isolators 21, 24, 31, and 34 are arranged for preventing the pre-amp 2 and the post-amp 3 from negatively influencing of other components.

The embodiment is further comprised of a photocoupler 4, long wave pass filter (LWPF) 5 and an LWPF controller 6. The photocoupler 4 is coupled to the input-stage of the EDFA 1 and enters the light signal in the LWPF controller 6. The LWPF 5 is located between the pre-amp 2 and the post-amp 3, and its cutoff wavelength is adjustable. The cutoff wavelength is set in the neighborhood of 1530 nm. Thus, a short-wavelength-part of the light signal which is amplified by the pre-amp 2, is cut off by the LWPF 5. The LWPF controller 6 detects an input signal power of the input light signal and adjusts the cutoff wavelength of the LWPF 5 based on the detected input signal power. If the detected input signal power is larger, the LWPF controller 6 shifts the cutoff wavelength of the LWPF 5 to the shorter wavelength side for adjusting the gain of the band at 1530 nm.

Figure 2:
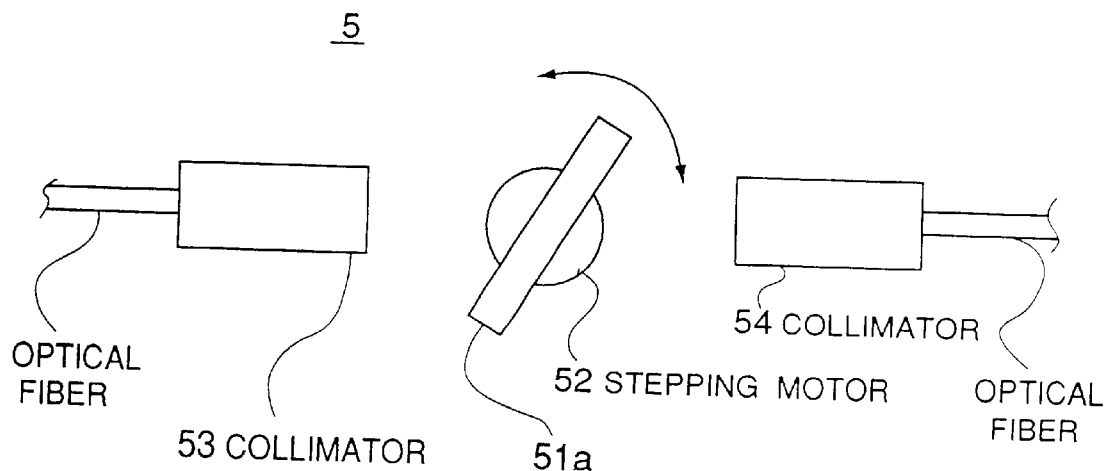
FIG. 2 is a schematic diagram of the LWPF 5 of the FIG. 1.

FIG. 2 is a schematic diagram of the LWPF 5 of the FIG. 1. An LWPF 51a is a conventional multiple layer dielectric plate, and the LWPF 5 changes a central wavelength λ c by rotating the LWPF 51a. A rotation angle of the LWPF 51a is controlled by a stepping-motor 52. In that case, if an angle of the LWPF 51a approaches the perpendicular relative to the direction of the light signal which is irradiated from a collimator 53, the central wavelength λ c shifts to the long wavelength side, while when the angle approximates the horizontal, the central wavelength λ c shifts to the short wavelength side. However, when the central wavelength λ c shifts to a short wavelength side, a polarization dependent loss(PDL) becomes large.

Figure 3:
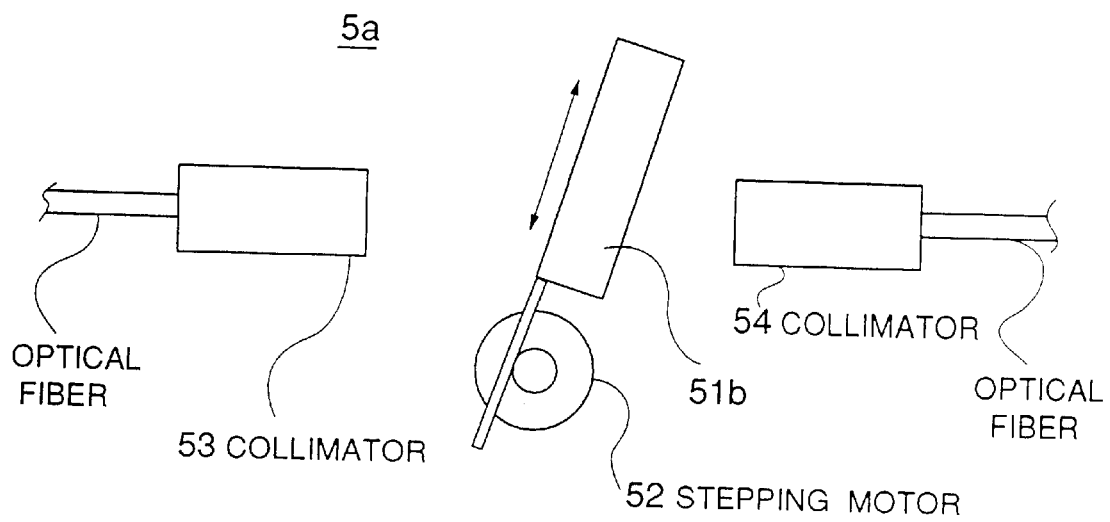

FIG. 3 is a modified LWPF 5a. An LWPF 51b has a structure such that the central wavelength λ c differs by place. The LWPF 5a changes the central wavelength λ c by shifting the LWPF 51b. Thus, the LWPF 5a is irradiated by the light signal from the collimator 53 to a place of appropriate central wavelength λ c. The amount of shift of the LWPF 51a is controlled by a stepping-motor 52 like the LWPF 5. The LWPF 5a reduces the PDL to about 0.1 dB below applicable entire wavelength region. The object of the first embodiment is to achieve gain equalization which is carried out regardless of the input signal power, for the covered signal-wavelength bands 1530~1560 nm. By using an Al-5 Wt. % doped EDF as the EDF 23 and the EDF 32, gain equalization of signal-wavelength bands 1540~1560 nm has been already achieved. Therefore, the gain equalization is measured concerning signal-wavelength bands 1530(~1540)nm. The Al-5 Wt. % doped EDF has a gain peak at the signal-wavelength bands 1530 nm, and as an input signal power Pin becomes large, a deviation of the gain peak from an equalized gain of the signal-wavelength bands 1540~1560 nm becomes small. And, when the input signal power Pin becomes fairly large, a gain saturation occurs and the gain becomes small beyond the other signal-wavelength bands. For this reason, equalization of the gain peak and avoidance of the gain saturation at the signal-wavelength band at 1530 nm is necessary.

In the above embodiment, the LWPF 5 cutoff wavelength is adjustable, and the LWPF 5 is adjusted the cutoff wavelength according to the input signal power Pin. Then, the EDFA changes the gain of the signal-wavelength band at 1530 nm. The LWPF 5 can be regarded as an inverse characteristic filter with respect to the wavelength-to-gain characteristics of the extensive input signal power Pin. The reason the LWPF 5 is located between the pre-amp 2 and the post-amp 3 is to avoid gain saturation.

The above embodiment is advantageous because:
(a) Noise components which is caused by an ASE and output from the EDF 23, can be filtered out from the amplified light signal.
(b) The LWPF 5 avoids the gain saturation on amplification by post-amp 3, because of the gain peak of the band at 1530 nm has been equalized before entering the post-amp 3.

In addition, though this first embodiment can not remove noise components caused by the post-amp 3, since the light signal which possesses fairly high power and carries few noise components is input to into the post-amp 3, even though noise is mixed by the post-amp 3, a sufficient S/N ratio can be insured.

Concerning the embodiment, the gain equalization has only to be achieved at the wavelength bands 1530~1560 nm of the light signal which is output from the post-amp 3. In other words, the gain of band 1530 nm does not needs to be not identical to the gain of bands 1540~1560 nm in the step which the light signal is output from the LWPF 5. To the extent that the gain of the light signal which is output from the LWPF 5 can achieve gain equalization of the light signal which is output from the post-amp 3, it has only to be equalized. The cutoff wavelength of LWPF 5 is selected corresponding to an output result from the post-amp 3.

Figure 4:
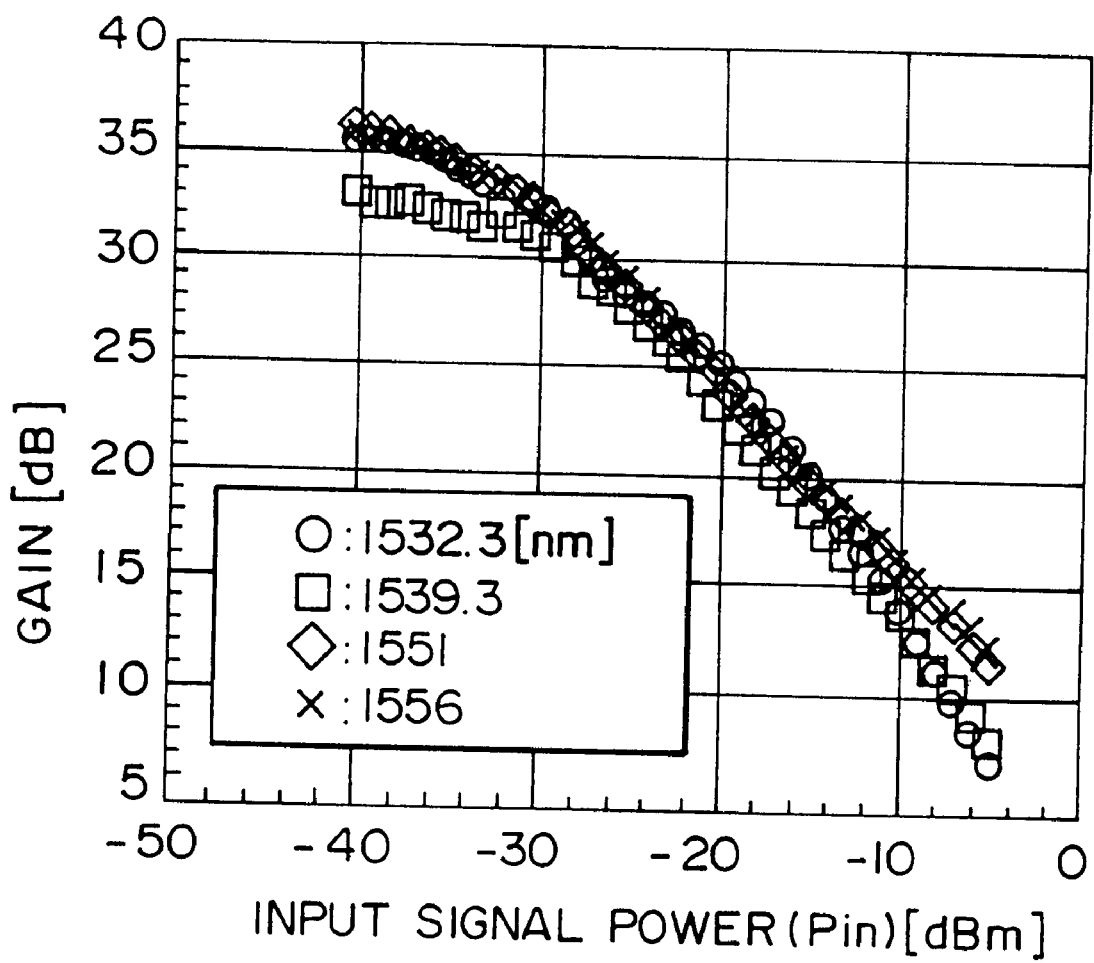
FIG. 4 is a graph showing input signal power verses gain characteristics of the first embodiment.

FIG. 4 shows an experimental result of input signal power versus gain characteristics of 4 wavelengths concerning the present embodiment. The gain of the light signals which are output from the post-amp 3, are equalized ranging over an extensive input signal power Pin and covering the wavelength bands 1530~1560 nm.

(B) SECOND EMBODIMENT

Figure 5:
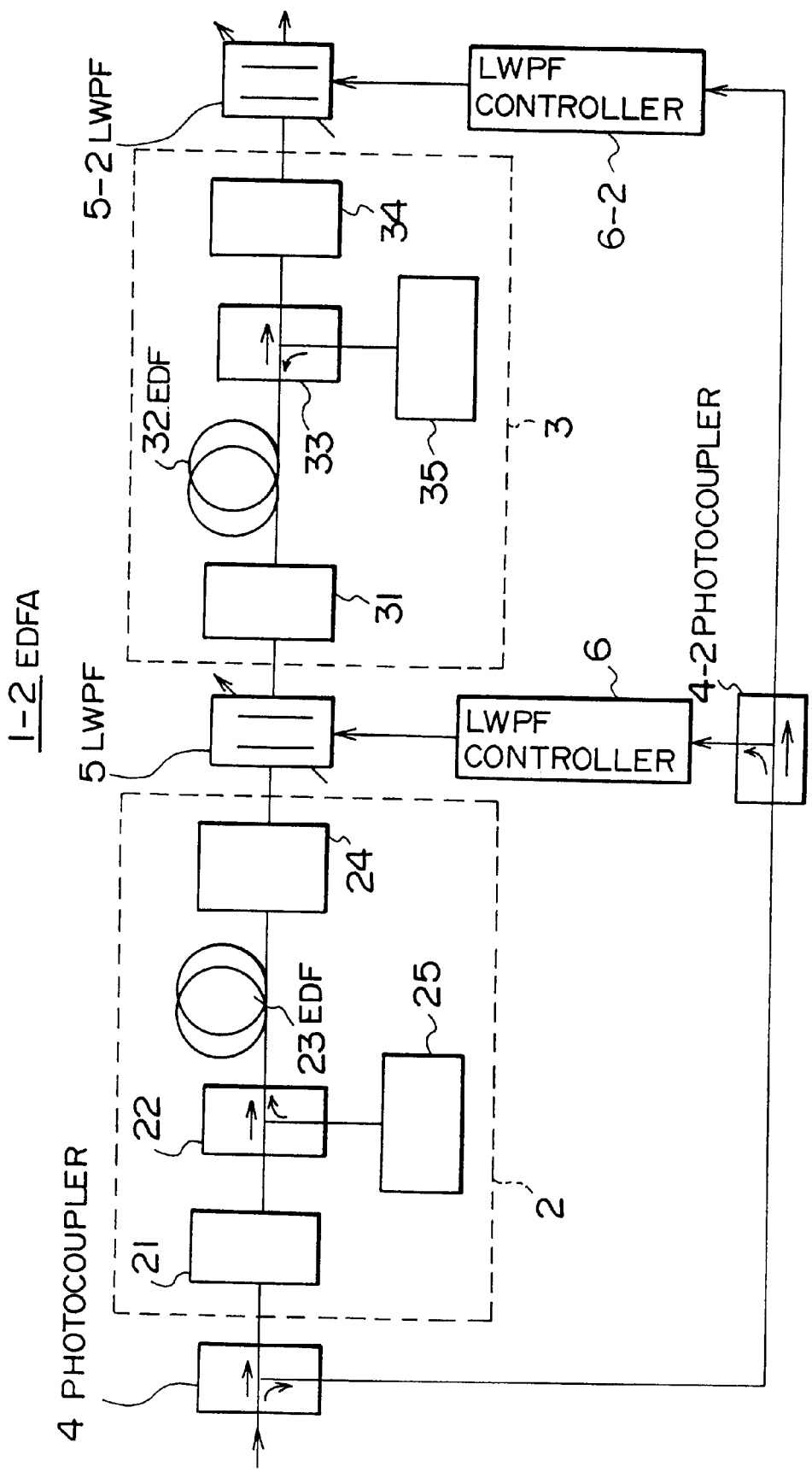
FIG. 5 is a schematic diagram of a second embodiment of the invention.

FIG. 5 is a schematic diagram of a second embodiment of the invention. In FIG. 5, an EDFA 1-2 is comprised of the LWPF 5 and an LWPF 5-2 whose cutoff wavelengths are adjustable, for equalizing gain peak of the band at 1530 nm. The LWPF 5 is located between the pre-amp 2 and the post-amp 3, and the LWPF 5-2 is located at the output side of the post-amp 3. And, in order to control the LWPF 5-2, the EDFA 1-2 additionally includes an LWPF controller 6-2 and a photocoupler 4-2. In other words, equalizer function responding to the gain peak of the input signal power of the band at 1530 nm is realized by the LWPF 5 and 5-2. Therefore, the EDFA 1-2 can achieve gain equalizing which ranges over extensive input signal power Pin and covers wide wavelength bands. Moreover, according to the second embodiment, the noise components caused by the post-amp 3 can be removed by the LWPF 5-2.

(C) THIRD EMBODIMENT

Figure 6:
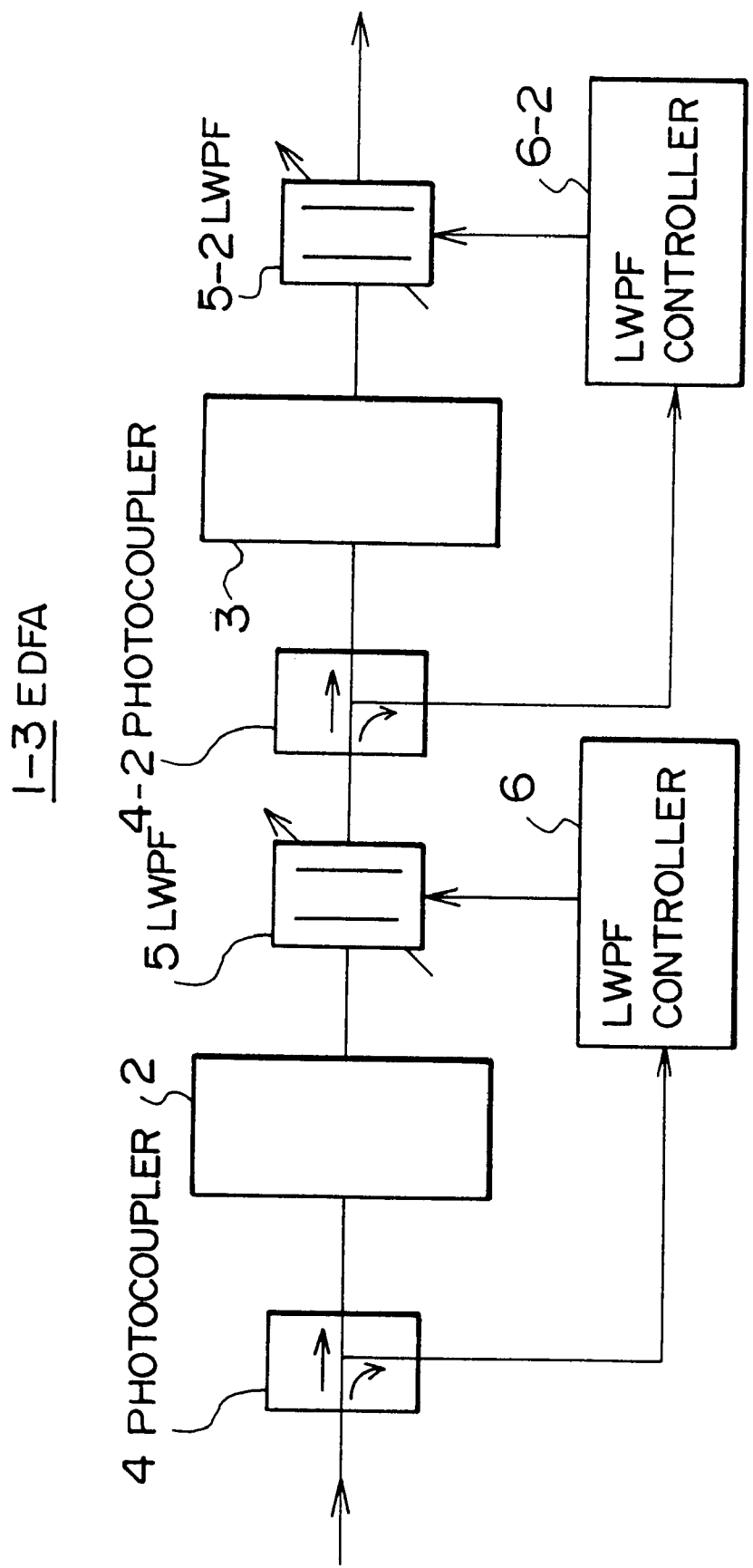
FIG. 6 is a schematic diagram of a third embodiment of the invention.

FIG. 6 is a schematic diagram of a third embodiment of the invention. In FIG. 6, an EDFA 1-3 is comprised of the photocoupler 4, the photocoupler 4-2, the LWPF 5, the LWPF 5-2, the LWPF controller 6 and the LWPF controller 6-2. The EDFA 1-3 differs from the EDFA 1-2 in the installed position of the photocoupler 4-2. In this embodiment, a cutoff wavelength of the LWPF 5-2 is adjusted in response to the input signal power. Therefore, EDFA 1-3 can achieve the gain equalizing which ranges over extensive input signal power Pin and covers wide wavelength bands. Moreover, according to the third embodiment, the noise components caused by the post-amp 3 can be removed by the LWPF 5-2.

(D) FOURTH EMBODIMENT

FIG. 7 is a schematic diagram of a fourth embodiment of the invention. In FIG. 7, an EDFA 1-4 comprises a pumping illumination source 36 which is comprised of a laser diode (LD), a long wave pass filter(LWPF)7 whose cutoff wavelength is fixed and a pumping illumination source controller 8. The pumping illumination source 36 connects with the photocoupler 33, and its pumping illumination power can be variable. The pumping illumination source 36 provides the EDF 23 with pumping illumination through the photocoupler 33. The pumping illumination source controller 8 detects the input signal power of the input light signal and varies the pumping illumination power of the pumping illumination source 36 based on the detected input signal power. If the detected input signal power is larger, the pumping illumination source controller 8 increases the pumping illumination power of the pumping illumination source 36. The LWPF 7 is located at the output side of the post-amp 3, and a short-wavelength-part of the light signal which is amplified by the pre-amp 3 is cut off. The cutoff wavelength is fixed in the neighborhood of 1530 nm.

Figure 8A:
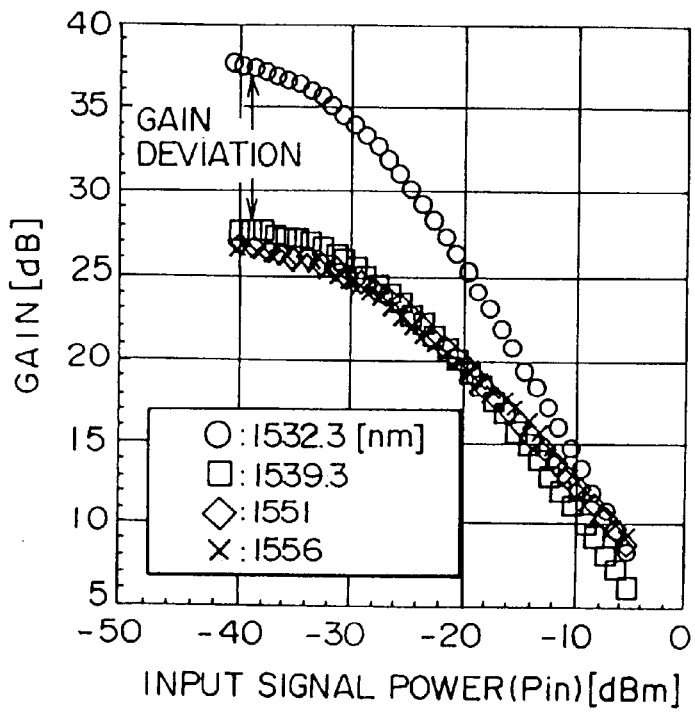
FIGS. 8(a) and 8(b) are fictitious graphs showing functions of the fourth embodiment.
Figure 8B:
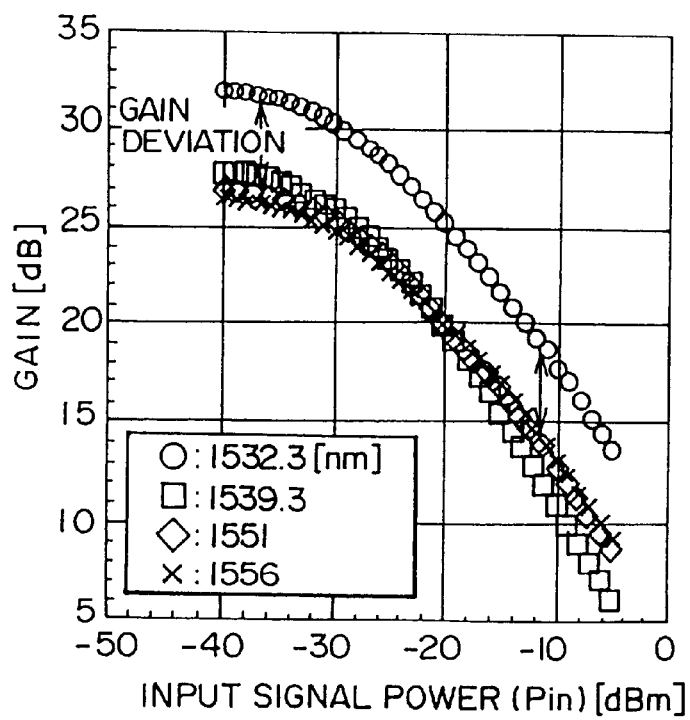

FIGS. 8(a) and 8(b) are fictitious graphs for explaining functions of the pumping illumination source controller 8 and the pumping illumination source 36. As shown in FIG. 8(a), gain deviation exists between the gain of the bands 1540~1560 nm and the gain of the bands 1530 nm. As the input signal power Pin becomes large, the gain deviation becomes small. If the gain deviation is a fixed value, the gain deviation can be removed by a fixed filter as shown in FIG. 8(b). In addition, when the gain deviation is the fixed value, the gain of the band at 1530 nm is made to improve in the range where input signal power Pin is large. Accordingly, gain saturation can be reduced. In this embodiment, the EDFA 1-4 includes the pumping illumination source 36 in order to change the gain deviation into the fixed value without regard to the input signal power, and includes the LWPF 7 in order to remove the fixed value gain deviation.

Figure 9A:
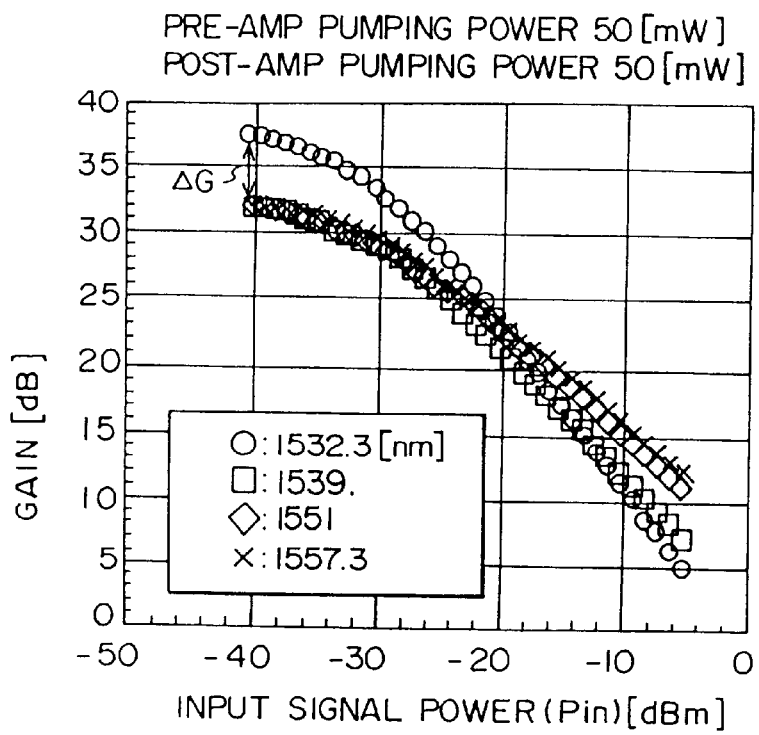
FIGS. 9(a) and 9(b) are graphs showing input signal power verses gain characteristics of the fourth embodiment.
Figure 9B:
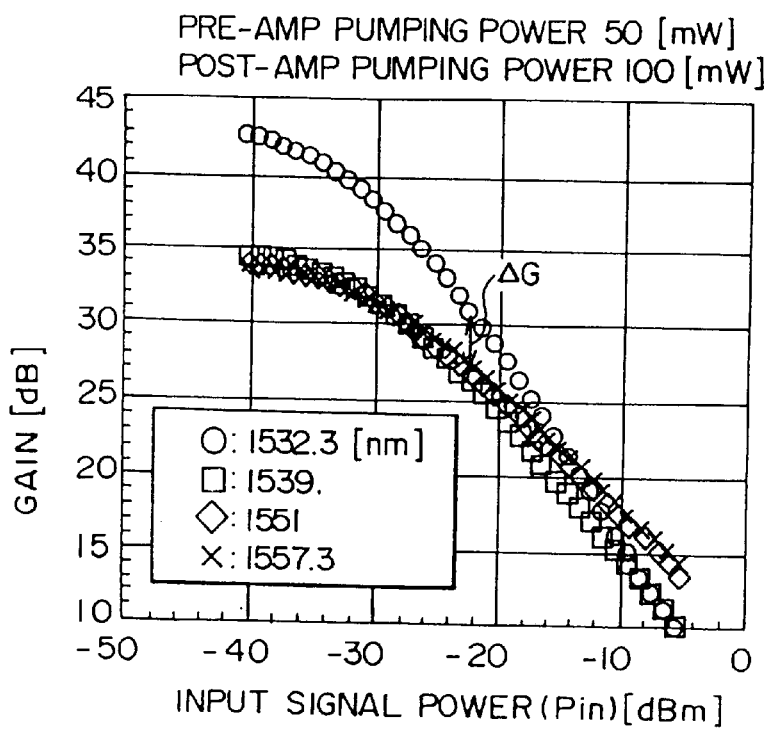

FIGS. 9(a) and 9(b) are graphs showing input signal power versus gain characteristics of the fourth embodiment. By changing the pumping illumination power corresponding to the input signal power Pin, the gain deviation can be changed into the fixed value. FIGS.9(a) and 9(b) show experimental results at 4 wavelengths concerning the fourth embodiment. In FIG. 9(a), the pumping illumination power of the pre-amp 2 is 50 mW, and the pumping illumination power of the post-amp 3 is 50 mW. And, in FIG. 9(b), the pumping illumination power of the pre-amp 2 is 50 mW, and the pumping illumination power of the post-amp 3 is 100 mW. The input signal power Pin of −40 dBm in FIG. 9(a) is defined as ΔG. On the other hand, in FIG. 9(b), when the input signal power Pin becomes about −22 dBm, the gain deviation becomes ΔG. Therefore, the gain deviation can be made fixed as follow. If the input signal power Pin becomes −40 dBm, the pumping illumination power of the post-amp 3 will be changed into 50 mW, and if the Pin becomes −22 dBm, the pumping illumination power will be changed to 100 mV. By suitably selecting the pumping illumination power, the gain deviation can be made fixed similarly even at different input signal powers.

Figure 10:
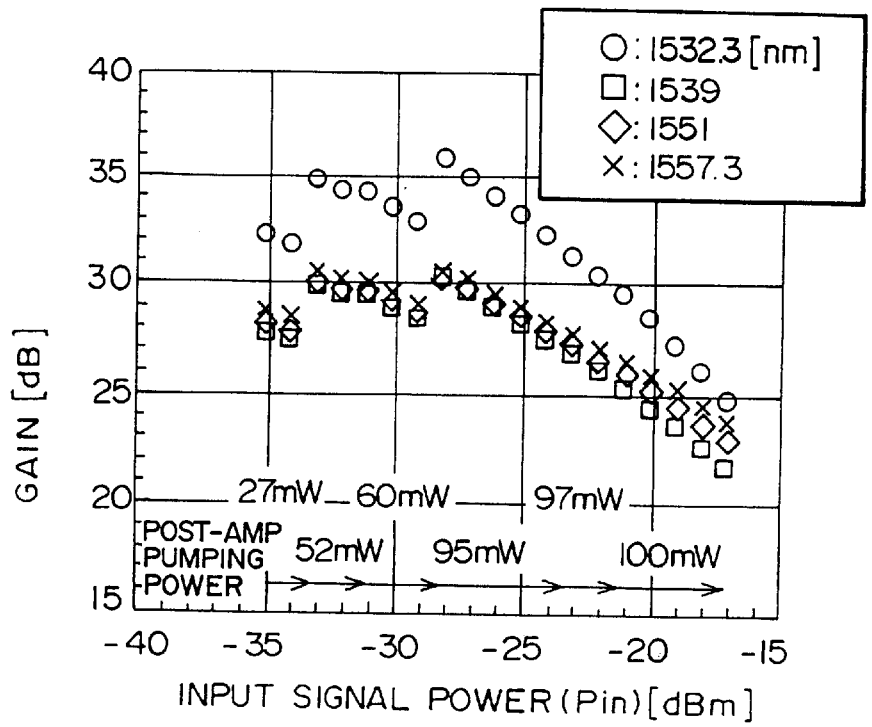
FIG. 10 is a graph showing input signal power verses gain characteristics of the fourth embodiment.

FIG. 10 is a graph which shows an experimental result of input signals power versus gain characteristics of the embodiment. In FIG. 10, the pumping illumination power of the post-amp 3 is changed gradually.

Figure 11:
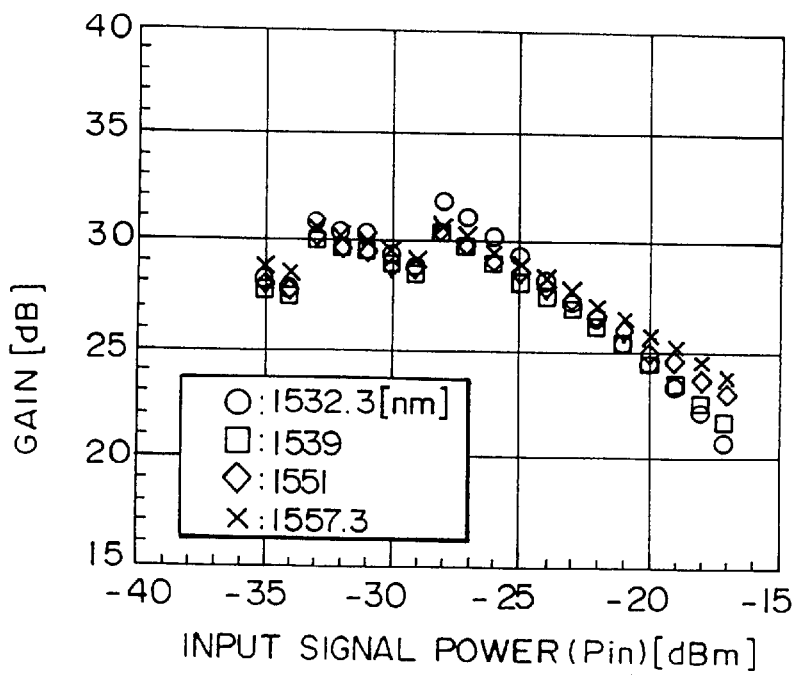
FIG. 11 is a graph showing input signal power verses gain characteristics of the fourth embodiment.

FIG. 11 is a graph showing input signal power versus gain characteristics after the light signal is passed through the LWPF 7. It is shown that the pumping illumination source 36 can change the gain deviation into the fixed value and the LWPF 7 can remove the fixed gain deviation.

(E) FIFTH EMBODIMENT

FIG. 12 is a schematic diagram of a fifth embodiment of the invention. An EDFA 1-5 is comprised of the LWPF 5, the LWPF controller 6, the pumping illumination source 36 and a pumping illumination source controller 8. The LWPF 5 is located between the pre-amp 2 and the post-amp 3, and its cutoff wavelength is adjustable. Thus, the short-wavelength-part of the light signal which is amplified by the pre-amp 2, is cut off by the LWPF 5. The LWPF controller 6 detects the input signal power of the input light signal and adjusts the cutoff wavelength of the LWPF 5 based on the detected input signal power. As it is clear from above-mentioned explanation, the fifth embodiment has two varieties of gain equalizing means, the pumping illumination source 36 whose power is variable and the LWPF 5 whose cutoff wavelength is adjustable. By these two varieties of gain equalizing means, the EDFA 1-5 can equalize a gain of the bands 1530 nm along with an equalization of gain of the bands 1540~1560 nm, and an equalizing error is mutually compensated.

(F) OTHER EMBODIMENTS

The invention can be applied to still more embodiments as follows.

Concerning each of the above-mentioned embodiments, the pre-amp 2 is adapted for forward pumping and the post-amp 3 is adapted for backward pumping. However, the pre-amp 2 may be adapted for backward pumping or bidirectional pumping. In addition, the post-amp 3 may be adapted for forward pumping or bidirectional pumping. Moreover, the invention can be applied to a single-stage optical fiber amplifier or a multistage(more than 3 stages) optical fiber amplifier. In the case of the single-stage, a cutoff wavelength adjustable LWPF is arranged on the output side.

In addition, the EDFA in each of the above-mentioned embodiments, All may include an optical fiber amplifier which is doped with other rare-earth element, for example a praseodymium(Pr)-doped fiber or a neodymium(Nd)-doped fiber can be applied to the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical fiber amplifier comprising:
   an optical fiber for direct amplifying an input light signal;
   a pumping illumination source for providing the optical fiber with pumping illumination;
   detecting means for detecting an input signal power of the input light signal;
   gain equalizing means for equalizing a gain of the input light signal; and
   a gain equalizing means controller for controlling the gain equalizing means based on the detected input signal power of the input light signal which is detected by the detecting means.

2. The optical fiber amplifier according to claim 1, wherein the gain equalizing means comprises a filter having an adjustable cutoff wavelength.

3. The optical fiber amplifier according to claim 2, wherein the gain equalizing means controller controls the filter so that if the input signal power is larger, the gain equalizing means controller shifts the cutoff wavelength of the filter to the shorter wavelength side.

4. The optical fiber amplifier according to claim 1, wherein the gain equalizing means comprises the pumping illumination source which has an adjustable pumping illumination power.

5. The optical fiber amplifier according to claim 4, wherein the gain equalizing means controller controls the pumping illumination source based on the input signal power of the detected input light signal, and if the input signal power is larger, the gain equalizing means controller increases pumping illumination power of the pumping illumination source.

6. The optical fiber amplifier according to claim 1, wherein the optical fiber is an erbium-doped optical fiber.

7. A multistage optical fiber amplifier which has a plurality of optical fibers for amplifying, the apparatus comprising:

a plurality of optical fibers for directly amplifying an input light signal which are connected in series;

a plurality of pumping illumination sources for providing the plurality of optical fibers with pumping illumination;

detecting means for detecting an input signal power of the input light signal;

at least one gain equalizing means for equalizing a gain of the input light signal; and at least one gain equalizing means controller for controlling the gain equalizing means based on the input power of the detected input light signal which is detected by the detecting means.

8. The multistage optical fiber amplifier according to claim 7, wherein the gain equalizing means comprises a filter having an adjustable cutoff wavelength.

9. The multistage optical fiber amplifier according to claim 8, wherein the plurality of optical fibers includes a first-stage optical fiber amplifier and further including a photocoupler coupled to an input-stage of the first-stage optical fiber amplifier and entering the input light signal to the at least one gain equalizing means controller.

10. The multistage optical fiber amplifier according to claim 8, wherein the filter is located between two optical fibers.

11. The multistage optical fiber amplifier according to claim 8, wherein the plurality of optical fibers includes a last-stage optical fiber amplifier and the filter is coupled to an output stage of the last-stage optical fiber amplifier.

12. The multistage optical fiber amplifier according to claim 7, wherein the at least one gain equalizing means comprises one of the pumping illumination sources which includes an adjustable pumping illumination power.

13. The multistage optical fiber amplifier according to claim 12, wherein the plurality of optical fibers includes a last-stage optical fiber amplifier and the one pumping illumination source provides the optical fiber of last-stage optical fiber amplifier with pumping illumination.

14. The multistage optical fiber amplifier according to claim 12, where the at least one gain equalizer means further comprises a filter having an adjustable cutoff wavelength.

15. The optical fiber amplifier according to claim 2, wherein the filter has a structure such that the central wavelength differs by place and the gain equalizing means adjusts a cutoff wavelength by shifting the filter.

16. The optical fiber amplifier according to claim 4, wherein the gain equalizing means comprises a pumping illumination source having adjustable pumping illumination power and a filter having an adjustable cutoff wavelength.

17. The multistage optical fiber amplifier according to claim 8, wherein the filter has a structure such that the central wavelength differs by place and the gain equalizing means adjusts a cutoff wavelength by shifting the filter.

* * * * *